US010670758B2

United States Patent
Khalil et al.

(10) Patent No.: US 10,670,758 B2
(45) Date of Patent: Jun. 2, 2020

(54) SPECTRAL ANALYSIS AND PROCESSING OF SEISMIC DATA USING ORTHOGONAL IMAGE GATHERS

(71) Applicant: CGG SERVICES SAS, Massy (FR)

(72) Inventors: Adel Khalil, Aberdeen (GB); Henning Hoeber, East Grinstead (GB); Bernard Deschizeaux, Aberdeen (GB)

(73) Assignee: CGG SERVICES SAS, Massy (FR)

( * ) Notice: Subject to any disclaimer, the term of this patent is extended or adjusted under 35 U.S.C. 154(b) by 524 days.

(21) Appl. No.: 15/311,654

(22) PCT Filed: Jun. 1, 2015

(86) PCT No.: PCT/IB2015/001054
§ 371 (c)(1),
(2) Date: Nov. 16, 2016

(87) PCT Pub. No.: WO2015/185991
PCT Pub. Date: Dec. 10, 2015

(65) Prior Publication Data
US 2017/0075009 A1    Mar. 16, 2017

Related U.S. Application Data

(60) Provisional application No. 62/049,385, filed on Sep. 12, 2014, provisional application No. 62/006,271, filed on Jun. 2, 2014.

(51) Int. Cl.
*G01V 1/36* (2006.01)
*G01V 1/28* (2006.01)
(52) U.S. Cl.
CPC .............. *G01V 1/364* (2013.01); *G01V 1/28* (2013.01); *G01V 2210/677* (2013.01)

(58) Field of Classification Search
USPC .......................................... 702/16
See application file for complete search history.

(56) References Cited

U.S. PATENT DOCUMENTS

2005/0232077 A1*  10/2005  Marmalyevskyy ...... G01V 1/28
                                                        367/47
2010/0211323 A1*   8/2010  Ozdemir ................. G01V 1/36
                                                        702/14
(Continued)

FOREIGN PATENT DOCUMENTS

EP          2113792 A1    11/2009
EP          2356492 A      2/2010
(Continued)

OTHER PUBLICATIONS

International Search Report in related International Application No. PCT/IB2015/001054, dated Feb. 17, 2016.
(Continued)

*Primary Examiner* — Paul D Lee
(74) *Attorney, Agent, or Firm* — Patent Portfolio Builders PLLC

(57) ABSTRACT

A method for spectral analysis of seismic data obtains imaged seismic data and generates orthogonally shifted imaged seismic data gathers. The orthogonally shifted imaged seismic data gathers are processed to generate a spectrally processed imaged seismic data. Alternatively, the imaged seismic data are obtained using a spectral processing filter that is a function of a magnitude of a total wavenumber of the imaged seismic data in three dimensions and a spatially variable velocity function.

11 Claims, 6 Drawing Sheets

(56) References Cited

U.S. PATENT DOCUMENTS

2010/0332139 A1* 12/2010 Bruun .................. G01V 1/282
  702/18
2015/0185348 A1* 7/2015 Turnbull ................ G01V 1/362
  702/14

FOREIGN PATENT DOCUMENTS

WO   2010/019957 A1   2/2010
WO   2011/109839 A2   9/2011

OTHER PUBLICATIONS

Written Opinion of the International Searching Authority in related International Application No. PCT/IB2015/001054, dated Feb. 17, 2016.

A.J. Cherrett, "Dip Correction for Convolutional Modelling and Elastic Inversion", 75th EAGE Conference & Exhibition incorporating SPE EUROPEC 2013, London, UK, Jun. 10-13, 2013.

A. Khalil et al., "RTM Noise Attenuation and Image Enhancement Using Time-Shift Gathers", SEG 81st Annual International Meeting, Houston, Texas, SEG Technical Program Expanded Abstracts, 2013, pp. 3789-3793.

S. Lancaster et al., "Fast-Track 'Coloured' Inversion", SEG 70th Annual International Meeting, SEG Technical Program Expanded Abstracts, 2000, pp. 1572-1575.

S. Lazaratos et al., "Inversion by Pre-Migration Spectral Shaping", SEG 79th International Exposition and Annual Meeting, Houston, Texas, SEG Technical Program Expanded Abstracts, 2009, pp. 2383-2387.

P. Sava et al., "Time-Shift Imaging Condition in Seismic Migration", Geophysics, Nov.-Dec. 2006, vol. 71, No. 6, pp. S209-S217.

* cited by examiner

SPECTRAL ANALYSIS AND PROCESSING OF SEISMIC DATA USING ORTHOGONAL IMAGE GATHERS

CROSS REFERENCE TO RELATED APPLICATIONS

This application claims priority and benefit from U.S. Provisional Patent Application Nos. 62/006,271, filed Jun. 2, 2014, for "Isotropic Wavelet Splitting" and 62/049,385, filed Sep. 12, 2014 for "Spectral Analysis and Processing of Seismic Data Using Orthogonal Image Gathers", the entire contents of which are incorporated herein by reference.

TECHNICAL FIELD

Embodiments of the subject matter disclosed herein generally relate to methods and systems for imaging recorded seismic data, more particularly, to the spectral filtering of imaged seismic data.

BACKGROUND

The aim of seismic data processing is to provide a reliable measure of the properties of the subsurface. Recorded seismic data is transformed into interpretable measures through a seismic processing sequence. This seismic processing sequence includes numerous steps, and these steps are categorized as pre-imaging, imaging, and post imaging processes. The imaging step transforms the recorded seismic data into an image with interpretable qualities. Spectral analysis plays an important role within the pre-imaging and post-imaging steps and is the basis of many applied processes. All filtering and convolution-based techniques, which can be as simple as a low-cut filter or elaborate as an elastic inversion, are founded on spectral theory, and correct analysis is important for success.

The pre-imaging processes include noise attenuation and regularization, among others. These pre-imaging processes assume that a one-dimensional (1D) convolutional model is applicable. Therefore, the data are the reflectivity of the subsurface convolved with a 1D wavelet, in time, where the data space is defined by recording time, and the x, and y directions. This is a reasonable approximation and is often valid within the limits of the experiment.

As pre-imaging seismic data are defined in terms of surface and time coordinates, where spectral analysis is based on the latter, no special attention is needed when applying filtering processes as temporal one-dimensional spectral analysis is truly representative of the recorded energy. The spatial wave-number components are intrinsically coupled to the temporal frequency by a dispersion relation, that is, they follow the wave equation at the recording surface.

As the 1D convolutional model simplifies many processes, this assumption is often also used for post migration processes, which is a reasonable approximation for flat geological settings. However, this approximation is very far from reality for steep or complex geological settings. Post-imaging data yield an image defined in x, y, and z. The three dimensions defining the space have no special significance with respect to one another, except for the sampling. That is, post imaging processes should be to some extent spatially isotropic.

Therefore, post-imaging seismic data is defined in terms of three-dimensional (3D) space coordinates. The seismic image represents the spatially variable reflectivity of the medium where the migration process effectively rotates the seismic wavelet to be normal to the direction of the medium reflectors. While this is the general case, it is often disregarded, and one-dimensional spectral analysis of the depth coordinate is still commonly used. This is usually performed after a depth-to-time conversion.

Assuming a convolutional model with a 3D spatially isotropic wavelet significantly increases the range of applicability of the post migration processes, applying filtering processes using this principle produces results valid for both steep and flat geological settings. However, using the assumption of a convolutional model with a 3D spatially isotropic wavelet introduces a complexity in seismic data processing, because the apparent spectral character of imaged seismic data is dependent on the velocity model, which can be spatially variable. Therefore, systems and methods for processing seismic data are desired that assume a convolutional model with a 3D spatially isotropic wavelet that compensate for spatial variability in the velocity model.

SUMMARY

Exemplary embodiments are directed to systems and methods that define the principle to be used in seismic data processing to be a convolutional model with a three-dimensional (3D) non-stationary spatially isotropic wavelet. A velocity model is used to control the non-stationary nature of the spatially isotropic wavelet deterministically. In addition, exemplary embodiments provide for spectral processing of post-imaging data in the direction normal to reflectors in order to provide accurate results for steep and complex subsurface structures. Orthogonal-Image-Gathers (OIGs) facilitate post-imaging data in the direction normal to a reflector, providing a platform for handling spatially variable spectral distortions due to the velocity field and other medium-related properties.

In accordance with one exemplary embodiment, a method for spectral analysis of seismic data includes obtaining imaged seismic data, generating orthogonally shifted imaged seismic data gathers and processing the orthogonally shifted imaged seismic data gathers to generate a spectrally processed imaged seismic data. In one embodiment, the imaged seismic data are obtained by obtaining recorded seismic data, applying temporal shifts to the recorded seismic data to generate temporally shifted recorded seismic data and migrating the temporally shifted recorded seismic data to temporally shifted imaged seismic data. In one embodiment, the temporally shifted data are gathered according to the applied temporal shifts to generate orthogonally shifted seismic data gathers. The spectrally processed imaged seismic data are then outputted.

In one embodiment, processing the orthogonally shifted imaged seismic data gathers to generate the spectrally processed imaged seismic data includes mapping the orthogonally shifted imaged seismic data gathers to a spectral processing domain and processing the mapped orthogonally shifted imaged seismic data gathers using a spectral processing function to generate the spectrally processed imaged seismic data. Suitable spectral processing functions include, but are not limited to, a frequency band splitting function, an elastic inversion function, an acoustic inversion function, an amplitude versus offset (AVO) stabilization function, an amplitude versus angle (AVA) stabilization function, a time-lapse time-shift estimation function, a spectral shaping function, a colored inversion function, a bluing function, a de-noising function, a demultiple function, a residual move-out application or picking and combinations thereof.

In one embodiment, processing the orthogonally shifted imaged seismic data gathers includes mapping the orthogonally shifted imaged seismic data gathers to a spectral processing domain according to at least one of a velocity field, a slowness field, a depth to time conversion, and a unity field. In another embodiment, generating orthogonally shifted imaged seismic data gathers includes transforming the imaged seismic data to spectral transform domain seismic data. In one embodiment, the spectral transform domain data are altered to introduce orthogonal shifts in a non-transform domain. The altered spectral transform domain data are inverse transformed to the non-transform domain to generate orthogonally shifted imaged seismic data. The orthogonally shifted imaged seismic data are gathered according to orthogonal shifts to generate the orthogonally shifted imaged seismic data gathers.

Exemplary embodiments are also directed to a method for spectral analysis of seismic data that includes obtaining imaged seismic data and processing the imaged seismic data using a spectral processing filter containing a magnitude of a total wavenumber of the imaged seismic data in three dimensions. In one embodiment, the spectral processing filter is defined in terms of a temporal frequency, where the temporal frequency is a function of the magnitude of the total wavenumber and a spatially variable velocity function. In another embodiment, the spectral processing filter is defined in terms of a temporal frequency, where the temporal frequency is a function of a converted temporal frequency that is determined using time transformed imaged seismic data and a constant velocity. Therefore, the imaged seismic data are converted from a depth domain to a time domain to generate the time transformed imaged seismic data, and the constant velocity is defined as a minimum value of a spatially variable velocity function.

In one embodiment, a spatially variable velocity function is defined, and the spectral processing filter is deterministically controlled by the spatially variable velocity function. In one embodiment, the spectral processing filter is a spatially isotropic spectral processing filter dependent only on the magnitude of the total wavenumber of the imaged seismic data. In another embodiment, the imaged seismic data is processed using a spectral processing filter by decomposing a spectrum into scales, applying a colored inversion operator, compensating for amplitude and phase distortion due to absorption effects or using a Q model to guide spectral filtering. In one embodiment, the imaged seismic data are processed using a spectral processing filter that performs at least one of an amplitude versus offset (AVO) and amplitude versus angle (AVA) process using a non-stationary spatially isotropic wavelet. In one embodiment, the isotropic wavelet is determined explicitly or is estimated from the imaged seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments apply the principle of a convolutional model with a 3D non-stationary spatially isotropic wavelet to a plurality of filtering processes in the post imaging process or sequence of seismic data processing. While described for 3D non-stationary spatially isotropic wavelets, the systems and methods described herein can be used with any 3D wavelet. Suitable 3D wavelets include isotropic and anisotropic wavelet depending on the type of subsurface media and desired precision. Suitable filtering or spectral analysis functions processes include, but are not limited to, stationary and non-stationary spatially isotropic wavelet splitting for Fresnel zone based filtering, and reconstruction, stationary and non-stationary estimation and application of amplitude and phase changes due to absorption, i.e. Q, stationary and non-stationary spectral balancing across offsets or angle, stationary and non-stationary intercept and gradient registration enhancement within a 3D isotropic wavelet, non-stationary spatially isotropic spectral shaping for inversion, i.e. colored inversion and bluing, amplitude versus offset (AVO) and amplitude versus angle (AVA) using a non-stationary spatially isotropic wavelet and wavelet estimation assuming a convolutional model with a 3D stationary or non-stationary spatially isotropic wavelet. In general, these filtering and spectral analysis functions are well known and available in the art.

Figure 1:
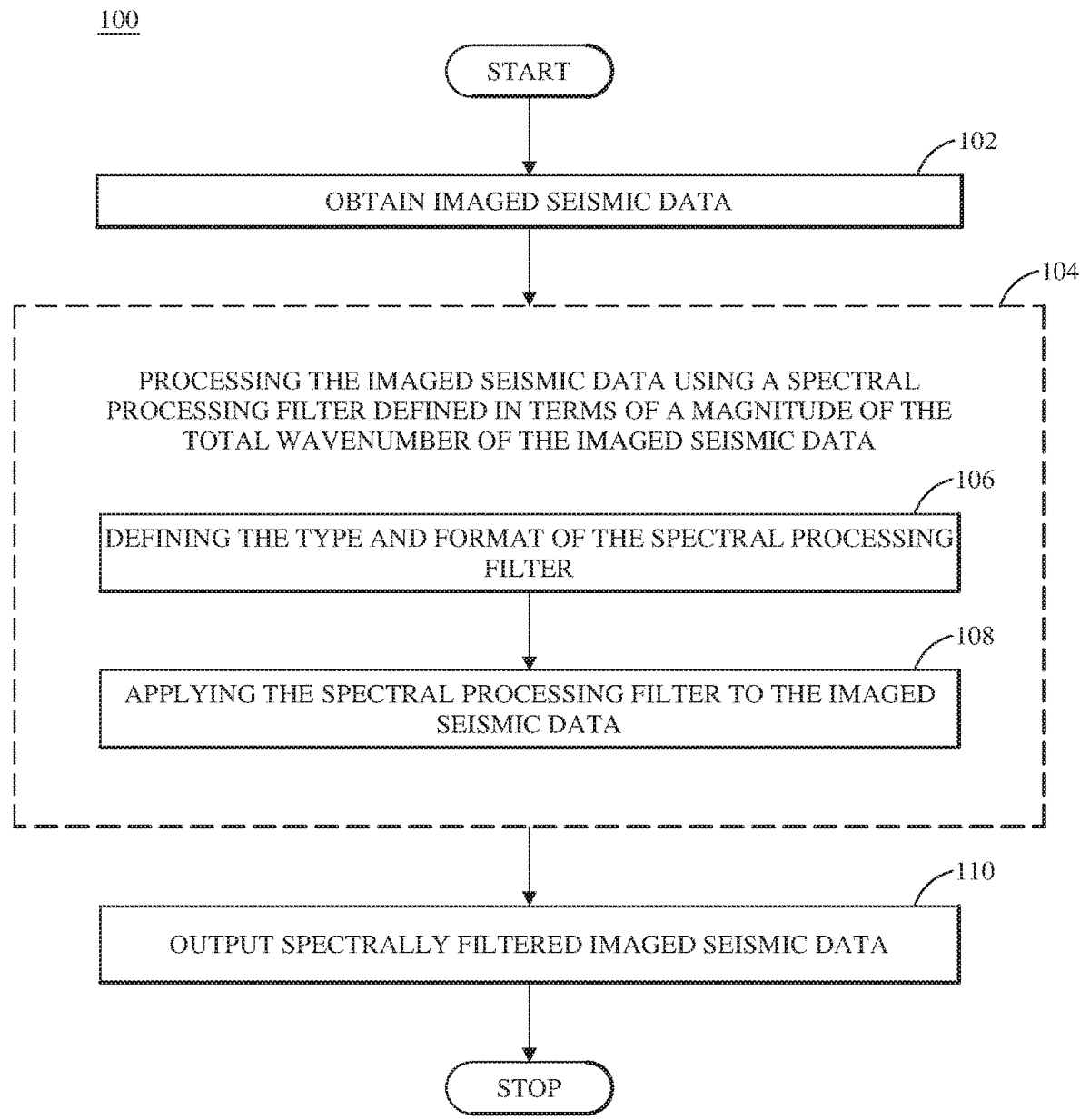
FIG. 1 is a flowchart of an embodiment of a method for spectral analysis of seismic data.

Referring initially to FIG. 1, exemplary embodiments are directed to a method for spectral analysis of seismic data 100. In particular, the present embodiment focuses on the post-processing of imaged seismic data. Therefore, imaged seismic data are obtained 102. In one embodiment, seismic data are recorded and are processed to generate the imaged seismic data. Any suitable method for generating imaged seismic data from recorded seismic data that is known and available in the art can be used. Typically, seismic data are recorded on the surface of the acquisition survey at discrete surface points and with a regular temporal sample interval. Temporal spectral analysis is then fully representative of the measured reflected data as it represents the total energy of the recorded wavefield and is intrinsically coupled to the spatial components by the dispersion relation. In one embodiment, obtaining the imaged seismic data includes pre-processing the recorded seismic data. Alternatively, the imaged seismic data can be obtained from one or more databases or repositories of imaged seismic data.

The imaged seismic data are processed using a spectral processing filter that is defined in terms of a magnitude of a total wavenumber of the imaged seismic data in three dimensions 104. Therefore, three dimensions are used that take into account the lateral and horizontal wave number on top of the vertical wave number as opposed to a single dimension that just takes into account the vertical wave number. This improves post-processing using the spectral processing filter for steep events in the imaged seismic data.

The spectral processing filter can be a spatially isotropic spectral processing filter that depends only on the magnitude of the total wavenumber of the imaged seismic data. To achieve spatially isotropic processing of post imaging seismic data any spectral process is extended to be defined in terms of the magnitude of the total wave-number of the data rather than using a single dimension. If a spectral processing filter is defined in terms of a single wave-number, for example $k_z$, the values of the single wave number are mapped to the magnitude of the total wave-number $|k|$, as in:

$$g_{iso}(|k|) = g(k_z) \quad (1)$$

The magnitude of the total wave-number is defined by:

$$|k| = \sqrt{k_x^2 + k_y^2 + k_z^2} \quad (2)$$

where g is the spectral processing filter and $g_{iso}$ is its isotropic counterpart.

In order to process the imaged seismic data using the spectral processing filter, the desired type and format of the spectral processing filter is defined 106. The spectral processing filter can be defined in a non-stationary sense or in a stationary sense. In addition, the spectral processing filter can be defined using a temporal frequency and a spatially dependent or spatially variable velocity function or velocity model. For example, a spatially variable velocity function is defined, and the spectral processing filter is deterministically controlled by this spatially variable velocity function.

In one embodiment, the spectral processing filter is defined in terms of a temporal frequency. This temporal frequency is a function of the magnitude of the total wave-number and the spatially variable velocity function. In this embodiment, the spectral processing filter is defined in a non-stationary sense. To define spectral filters in terms of the temporal frequency, f, the mapping may take the form:

$$g_{iso}(\hat{f}, x) = g(f) \quad (3)$$

where the local frequency $\hat{f}(x)$ is given by:

$$\hat{f}(x) = \frac{1}{2} \frac{|k|}{2\pi} v(x) \quad (4)$$

The mapping now is space dependent as the velocity v(x) can be spatially variable. In this case the filters are defined in a non-stationary sense.

Alternatively, the spectral processing filter is defined in terms of a temporal frequency and a constant velocity. The temporal frequency is a function of a converted temporal frequency that is determined using time transformed imaged seismic data. For example, the imaged seismic data is transformed from a depth domain to a time domain to generate the time transformed imaged seismic data. In one embodiment, the constant velocity is defined as a minimum value of the spatially variable velocity function.

In this embodiment, an approximation of equation 4 is generated by defining a simple depth-to-time conversion of the imaged data and then defining a constant replacement velocity. The depth to time conversion of the data may take the form:

$$d_{depth}(x,y,z) = d_{time}(x,y,\tau) \quad (5)$$

Equation 4 is transformed to:

$$\hat{f} = \sqrt{(f_\tau)^2 + \left(\frac{1}{2}\frac{k_y}{2\pi}v\right)^2 + \left(\frac{1}{2}\frac{k_x}{2\pi}v\right)^2} \quad (6)$$

Where $f_\tau$ is the temporal frequency of the depth-to-time transformed τ axis.

In this implementation the filter is stationary and the velocity used is the minimum of the model, ensuring that no energy in the model is being under-boosted and ensuring consistency with the conventional non-isotropic implementation with the velocity set to zero.

Having defined the desired type and format of spectral processing filter, the spectral processing filter is applied to the imaged seismic data 108. Any method of applying non-stationary and stationary spectral processing filters known and available in the art may be used. Suitable methods for applying the spectral processing filter include, but are not limited to, decomposing a spectrum into scales, applying a colored inversion operator, compensating for amplitude and phase distortion due to absorption effects and using a Q model to guide spectral filtering all of which are known and available to one of skill in the art.

In one embodiment of decomposing a spectrum into scales, wavelet splitting is used to apply the spectral processing filter for both stationary and non-stationary spectral processing filters. In one embodiment, spatially isotropic wavelet splitting for Fresnel zone based filtering is used in which splitting filters defined in time or in vertical wave-number are mapped to the magnitude of the total wave-number as defined by equation 1 or 3. The data are split according to the mapped filters, and Fresnel zone based filtering is performed, for example dip consistent filtering, intercept and gradient registration, among others. The data are then reconstructed by summing the split scales together. The use of spatially isotropic wavelet splitting of the data results in a more coherent image without the steep dips leaking into the lower frequency scales.

In one embodiment of applying a colored inversion operator, spectral shaping is for inversion, i.e., colored inversion and bluing, for non-stationary spectral processing filters. In this embodiment, spectral shaping filters are derived to match reflectivity to acoustic impedance using well data. A migration velocity model or the spatially variable velocity function is identified, and the non-stationary isotropic filters are constructed by mapping the local spectral attributes, i.e., wave-number of the imaged seismic data, and the migration velocity model according to equation 4. The resulting non-stationary isotropic filters are then applied. This non-stationary implementation provides a cleaner result with no over-boosting of steeply dipping energy.

Regarding isotropic filtering through colored inversion, the one dimensional model assumes that events, after migration, i.e., after seismic data image generation, are horizontal and does not deal with steeply dipping events. Applying colored inversion after migration leads to steep events being seen as low frequency. Therefore, these steep events are overly boosted. The same applies for imperfectly collapsed migration swings, which appear as noise. To correct for this problem, pre-migration spectral shaping can be applied, or a coloring operator can be applied in a three dimensional isotropic sense. In colored inversion, the spectra of the migrated data are fit to the well using the following relationship:

$$20 \log[A(f)] = \alpha + 20\beta \log[1 + f/\gamma].$$

This spectral operator transforms the reflectivity into acoustic impedance. Frequency is the measure of 'change' in a signal, but, in seismic image data, "change" is not only in the vertical direction, i.e., not only time or depth. Therefore, the operator preferably matches the total magnitude of change, which includes dipping or even horizontal change for a vertical reflector.

The magnitude of 'change' of reflectivity in the direction normal to the reflector is given by the magnitude of the total wavenumber, e.g., $k_m$. The filter is then applied isotropically and not just vertically. However, the seismic image is not stationary. The local spectrum of the seismic image data is stretched and squeezed according to the spatially variable velocity function or spatially variable migration velocity as expressed in the following equation for the temporal frequency:

$$f = \frac{1}{2} \frac{k_m}{2\pi} v(x, y, z).$$

The wavelet in a low velocity region is squeezed, and the wavelet in a high velocity region is stretched.

A solution is to use non-stationary spectral processing filters that are both velocity and frequency dependent as represented by the following equation:

$$A(k_m, x, y, z) = A\left[\frac{1}{2} \frac{k_m}{2\pi} v(x, y, z)\right]$$

Spectral processing is performed in the depth domain without stretching to time. This yields an exact solution.

For an approximate solution, time stretched data are used as given by the following transformation:

$$d(x,y,z) \rightarrow d(x,y,t)$$

Performing a Fourier transform yields $d(x, y, t) \rightarrow d(k_x, k_y, f_t)$. Stretching the spatial spectra according to a replacement velocity $$f_{x,y} = \frac{1}{2} \frac{k_{x,y}}{2\pi} v,$$

yields $d(k_x, k_y, f_t) \rightarrow d(f_x, f_y, f_t)$. A map is then created for the absolute magnitude of the frequency, $f = \sqrt{f_t^2 + f_x^2 + f_y^2}$. Applying the frequency dependent CI operator according to the map yields:

$$(f_x, f_y, f_t) \xrightarrow{f = \sqrt{f_t^2 + f_x^2 + f_y^2}} d(f) \times A(f).$$

In one embodiment of compensating for amplitude and phase distortion due to absorption effects, i.e., Q, for both stationary and non-stationary spectral processing filters, spectral processing filters are defined according to equation 1 or equation 3. The change in at least one of amplitude and phase across all spectral components are then analyzed. The observed changes are inverted to generate a Q model. In one embodiment of using a Q model to guide spectral filtering for both stationary and non-stationary spectral processing filters, absorption compensation filters are generated using a Q model. The mapped filters are then applied according to equation 1 or equation 3.

Additional applications of the spectral processing filters include the use of spectral balancing and the use of intercept and gradient registration enhancement within a three dimensional isotropic wavelet. In both algorithms, spectral balancing operators are derived across offset or angle classes, and the mapped balancing operators are applied according to equation 1 or 3.

In one embodiment, processing the imaged seismic data using a spectral processing filter comprises performing an AVO or AVA process using a non-stationary spatially isotropic wavelet. The non-stationary isotropic wavelet can be defined explicitly or can be estimated from the imaged seismic data assuming a convolution model with a three dimensional stationary or non-stationary spatially isotropic wavelet. Having applied the spectral processing filter to the imaged seismic data, spectrally filtered imaged seismic data are outputted 110.

Figure 2:
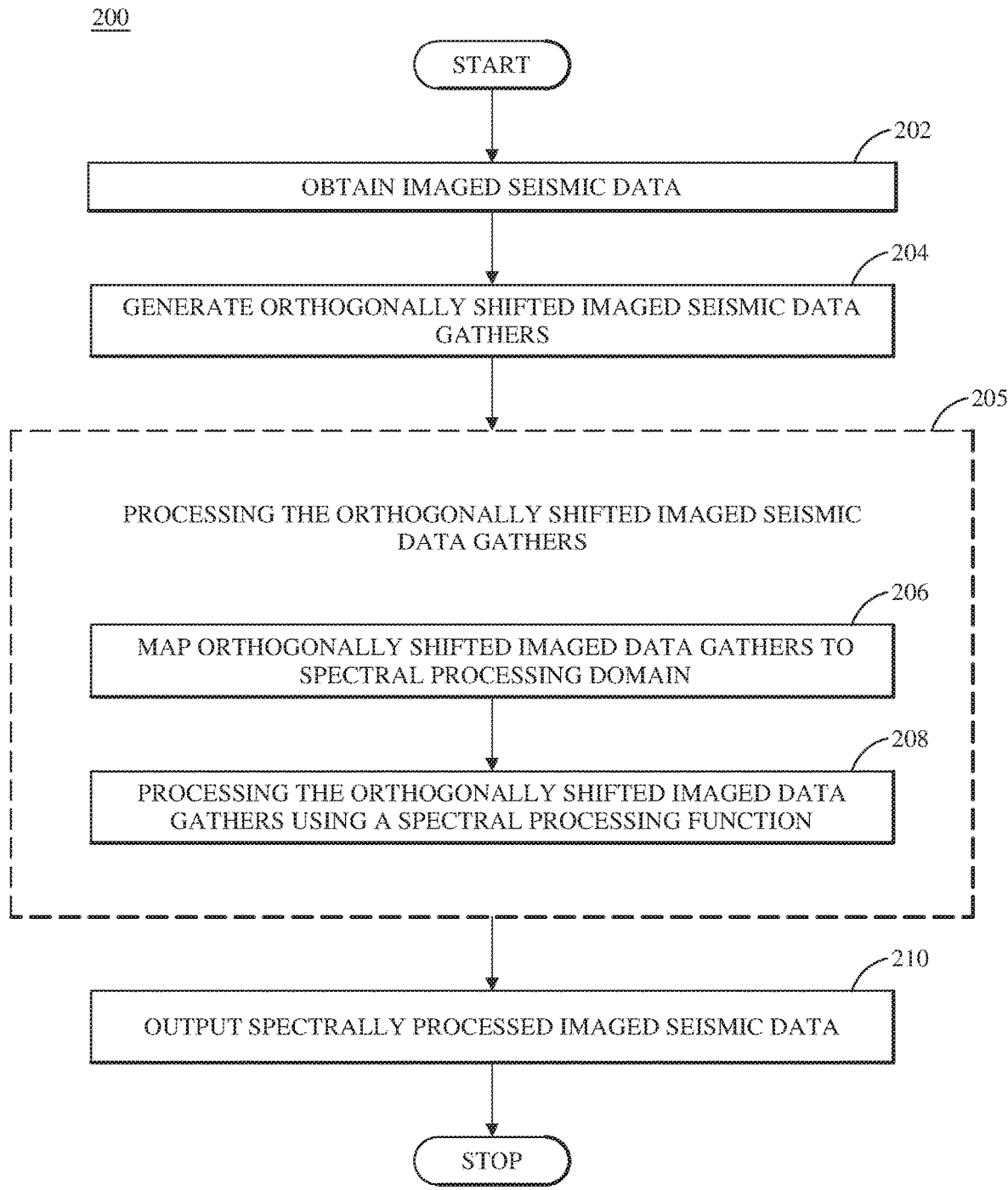
FIG. 2 is a flowchart of another embodiment of a method for spectral analysis of seismic data.

Referring to FIG. 2, another exemplary embodiment of a method for spectral analysis of seismic data 200 is illustrated. This embodiment utilizes orthogonally shifted imaged seismic data gathers, which are obtained using either temporally shifted seismic data or seismic data that have been transformed into a spectral domain. Initially, imaged seismic data are obtained 202. In one embodiment, recorded seismic data are obtained, and temporal shifts, either forward in time or backwards in time, are applied to the recorded seismic data to generate temporally shifted recorded seismic data. These temporally shifted recorded seismic data are migrated to temporally shifted imaged seismic data. Suitable methods for migrating recorded seismic data to imaged seismic data include, but are not limited to, reverse-time migration, Kirchoff migration and beam migration. Alternatively, recorded seismic data are migrated directly to imaged seismic data without temporal shifting. Again, suitable methods for migrating recorded seismic data to imaged seismic data include, but are not limited to, reverse-time migration, Kirchoff migration and beam migration. In one embodiment, the recorded seismic data are subject to pre-processing before migration to an image domain.

As recorded seismic are obtained by an acquisition survey from a plurality of discrete surface points at a regular sample interval, temporal spectral analysis is fully representative of the measured reflected data as this analysis represents the total energy of the recorded wavefield and is intrinsically coupled to the spatial components by the dispersion relation. This dispersion relation is derived from the governing wave equation. In the acoustic case, the dispersion relation is:

$$f = \frac{1}{2\pi} v \sqrt{k_x^2 + k_y^2 + k_z^2} \qquad (7)$$

where f is the temporal frequency, v is the velocity at the recording surface and $k_x$, $k_y$ and $k_z$ are the spatial wave-numbers.

Figure 3:
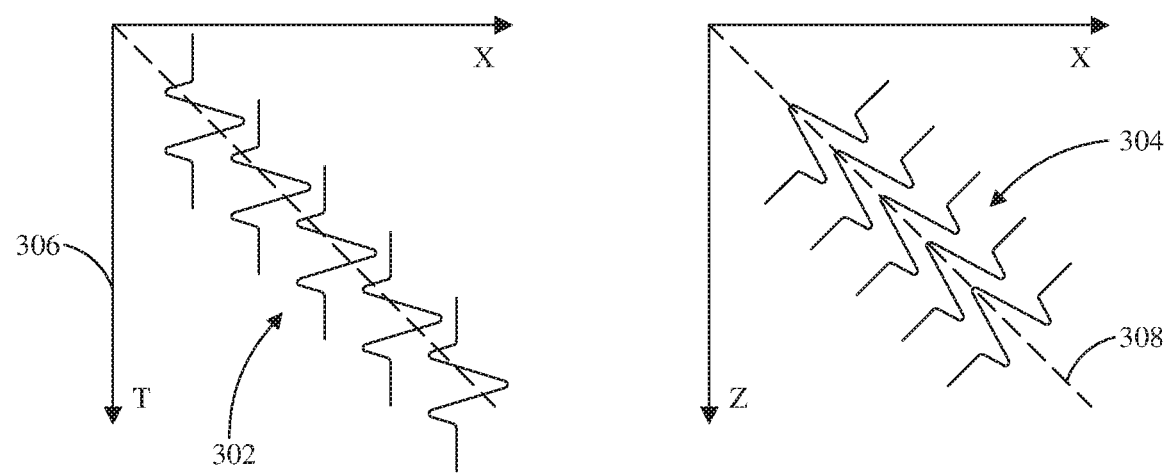
FIG. 3 is a graphical representation of an embodiment of a seismic wavelet for pre-imaging and post-imaging data.

Imaging algorithms map the recorded energy on the surface back to the subsurface location which generated the reflection. The wavelet essentially becomes three-dimensional. In net effect, the wavelets are orientated towards the direction which is normal to the reflector. Referring to FIG. 3, wavelets for seismic data before imaging 302 are compared to wavelets for seismic data after imaging 304. Before imaging, the wavelets are aligned, i.e., parallel to, the time axis 306. Therefore, in the pre-imaging case, one dimensional spectral analysis is valid.

After imaging, the wavelets are orthogonal to the reflector 308, and the depth variations are stretched by the dip. Therefore, to perform correct spectral analysis of post-imaging data, spectral analysis of the imaged seismic data is performed in the direction normal to the reflector. This analysis normal to the reflector is achieved by utilizing the magnitude of the total wave-number. A mapping is utilized to link this wave-number to the temporal frequency, which is used to define and construct spectral processing filters.

Returning to FIG. 2, the method for conducting spectral analysis of the seismic data to perform analysis normal to the reflector generates orthogonally shifted imaged seismic data gathers 204. In one embodiment, time shifted seismic data are utilized. Therefore, a relationship is utilized to convert temporally shifted seismic data gathers, for example as obtained from migration processes such as Reverse-Time-Migration (RTM), into angle gathers or orthogonally shifted seismic data gathers. The dispersion relation equation utilized for this mapping holds the attributes necessary to map the total wave-number to the temporal frequency. After rearranging variables the dispersion relation equation reads:

$$f = \frac{1}{2\pi} \frac{c(x)}{2} \frac{\|k\|}{|\cos(\theta)|} \qquad (8)$$

where $c(\underline{x})$ is the spatially variable velocity function of the medium and θ is the reflection angle between the source and the receiver wavefields. By comparison to Equation 7, Equation 8 includes is an extra factor of one half. This is due to the fact that the image is the product of two wavefields, and, therefore, the wave-number is doubled. This is mitigated in the 1D case by the use of two-way time. The cosine factor describes the angle dependent migration stretch phenomenon.

While Equation 8 provides the mapping relationship between the total wave-number and the temporal frequency needed to spectrally process post-imaging data, it has a spatially variable velocity term which renders the mapping non-stationary.

Figure 4:
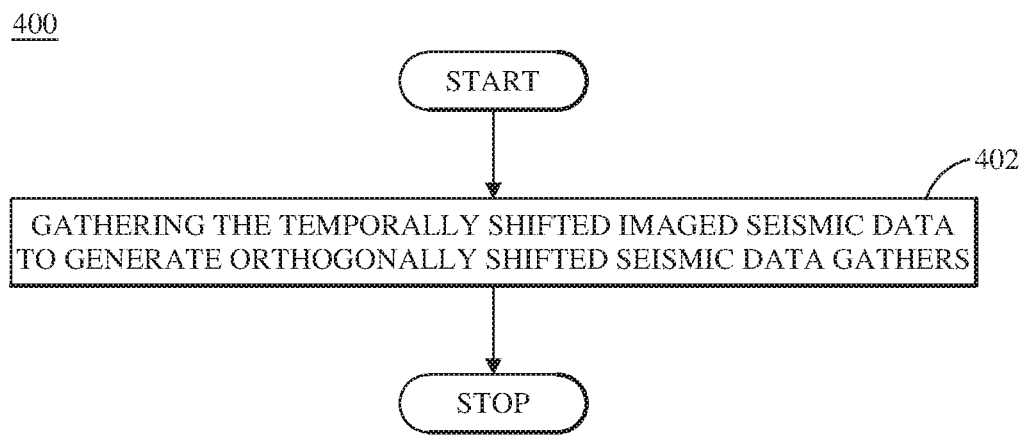
FIG. 4 is a flowchart of an embodiment of a method for generating orthogonally shifted imaged seismic data gathers.

Referring to FIG. 4, an exemplary embodiment for obtaining the orthogonally shifted imaged seismic gathers 400 utilizing the time shifted recorded seismic data is illustrated. The temporally shifted imaged seismic data are gathered according to the applied temporal shifts to generate orthogonally shifted seismic data gathers 402.

In another embodiment, the spectral domain is utilized in generating the orthogonally shifted imaged seismic data. In this embodiment, a transformation is introduced to locally stretch RTM time-shift gathers, indexed by τ, into orthogonal offset ζ:

$$\zeta = \frac{1}{2} c(x) \tau \qquad (9)$$

In this embodiment, inverse transform operations are utilized, i.e., Orthogonal-Image-Gathers (OIGs) are generated by incrementally applying orthogonal displacements to the seismic image. This is easily achieved in wave-number domain through the Fourier translation property. This operation is represented by:

$$I(\underline{k}; \zeta) = I_0(\underline{k}) e^{-i|\underline{k}|\zeta} \qquad (10)$$

where $I_0$ is the input seismic image. OIGs are generated by inverse-transforming back into space domain, where the orthogonal offset is mapped to the time axis using Equation 9:

$$I(\underline{x}; \tau) = I\left(\underline{x}; \tau = \frac{2}{c(x)} \zeta\right) \qquad (11)$$

The τ coordinate of $I(\underline{x}; \tau)$ is data in the direction normal to the reflector at each imaged point. Spectral analysis on this axis is correct for all dipping and non-dipping structures. Non-stationary and spatially variable effects, such as from the velocity, are now accessible and can be easily handled.

Figure 5:
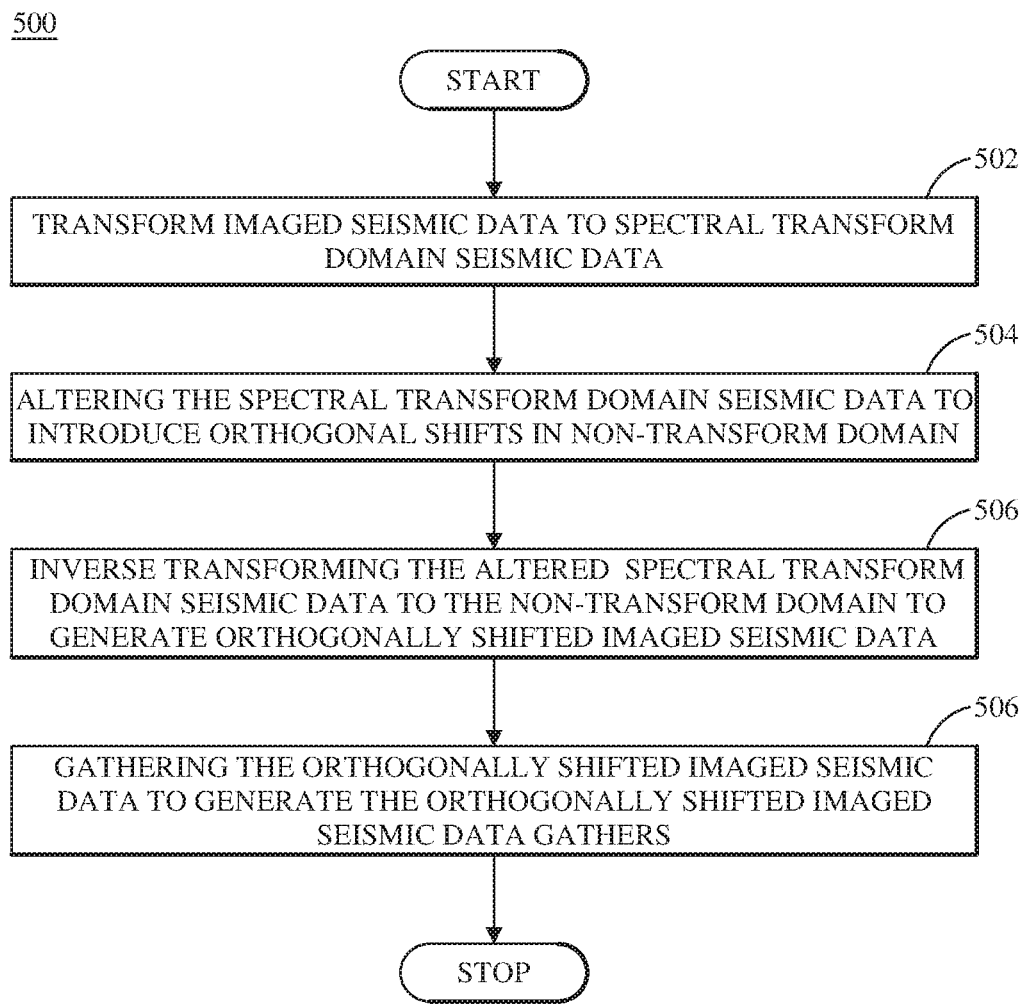
FIG. 5 is a flowchart of another embodiment of a method for generating orthogonally shifted imaged seismic data gathers.

Referring to FIG. 5, an embodiment of using inverse transformation to generate orthogonally shifted imaged seismic data 500 is illustrated. The imaged seismic data are transformed to spectral transform domain seismic data 502. Suitable methods for conducting this transformation include, but are not limited to, using a Fourier transform. The spectral transform domain seismic data are altered to introduce orthogonal shifts in a non-transform domain 504. Suitable methods for introducing these shifts include, but are not limited to, Fourier multiplying by a phase factor. The altered spectral transform domain seismic data are then inverse transformed to the non-transform domain to generate orthogonally shifted imaged seismic data 506. The orthogonally shifted imaged seismic data are gathered according to the orthogonal shifts to generate the orthogonally shifted imaged seismic data gathers 508.

Returning to FIG. 2, the orthogonally shifted imaged seismic data gathers are processed 205 to generate a spectrally processed imaged seismic data. This includes mapping the orthogonally shifted imaged seismic data gathers to a spectral processing domain 206. Spectral processing functions within this spectral processing domain can then be used. Suitable spectral processing functions include, but are not limited to, a frequency band splitting function, an elastic inversion function, an acoustic inversion function, an AVO stabilization function, an AVA stabilization function, a time-lapse time-shift estimation function, a spectral shaping function, a colored inversion function, a bluing function, a de-noising function, a demultiple function, a residual move-out application or picking, and combinations thereof. In one embodiment, the orthogonally shifted imaged seismic data gathers are mapped to a spectral processing function according to at least one of a velocity field, a slowness field, a depth to time conversion, and a unity field. For example, zeta can be mapped to time according to the function zeta=0.5*velocity*time.

The orthogonally shifted imaged seismic data gathers are processed using a spectral processing function 208 to generate the spectrally processed imaged seismic data. The spectrally processed imaged seismic data are then output 210.

For post imaging data, conventional depth axis based spectral processing is not valid for dipping events (with or without time-to-depth conversion). Spectral processing in the direction normal the reflector is the correct way. Orthogonal-Image-Gathers can be used to extract the spectral content variations in the direction normal to the reflector in a spatially variable manner. The spectral content is one or more attributes of the image. One of such attribute is spatial reflectivity variation observed after the migration process. The concept is applicable to any process, for example: absorption compensation and estimation, elastic and acoustic inversion, and AVO or AVA stabilization, 4D time-shift estimation, Spectral shaping, Colored Inversion, Bluing, general denoising, demultiple, wavelet estimation, and wavelet splitting. Each of these and other possible applications is readily applied from the techniques described herein by one skilled in the art having the benefit of this disclosure.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for spectral analysis of seismic data in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

Figure 6:
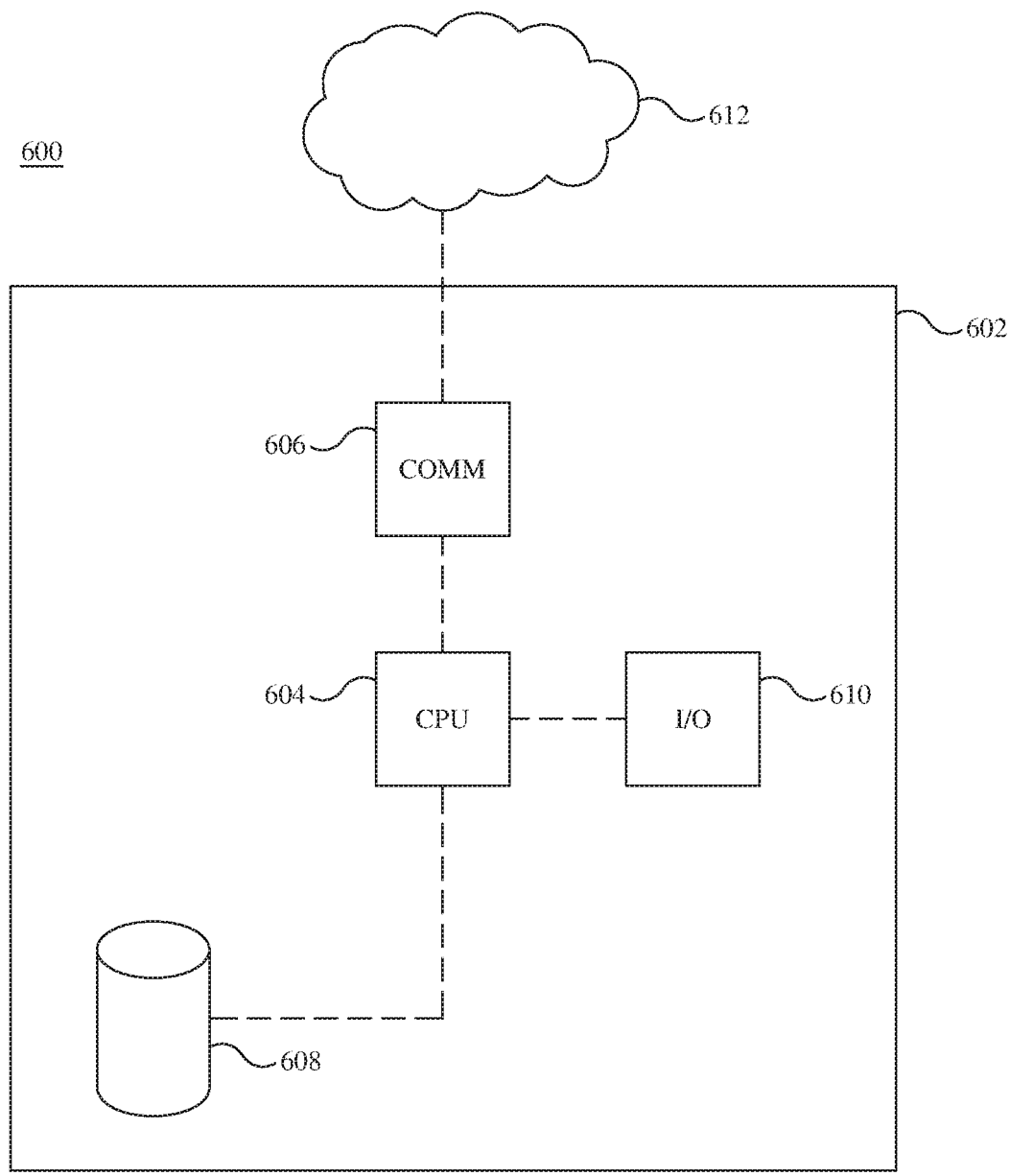
FIG. 6 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 6. The computing system 600 includes a computer or server 602 having one or more central processing units 604 in communication with a communication module 606, one or more input/output devices 610 and at least one storage device 608. All of these components are known to those of ordinary skill in the art, and this description includes all known and future variants of these types of devices. The communication module provides for communication with other computing systems, databases and data acquisition systems across one or more local or wide area networks 612. This includes both wired and wireless communication. Suitable input-output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 600 can be used to implement the methods described above associated with the calculation of the induced source shot gather. Hardware, firmware, software or a combination thereof may be used to perform the various steps and operations described herein.

The disclosed exemplary embodiments provide a computing device, software and method for spectral analysis of seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for spectral analysis of seismic data, the method comprising:
   obtaining temporally shifted imaged seismic data from migrating recorded seismic data that has been temporally shifted;
   generating orthogonally shifted imaged seismic data gathers by gathering the temporally shifted imaged seismic data; and processing the orthogonally shifted imaged seismic data gathers in a spectral processing domain using a spectral processing function to generate spectrally processed imaged seismic data.

2. The method of claim 1, wherein obtaining the imaged seismic data comprises:
   obtaining the recorded seismic data;
   applying temporal shifts to the recorded seismic data to generate temporally shifted recorded seismic data; and
   migrating the temporally shifted recorded seismic data to generate the temporally shifted imaged seismic data.

3. The method of claim 2, wherein the temporally shifted imaged data is gathered according to the temporal shifts applied to the recorded seismic data to generate the orthogonally shifted imaged seismic data gathers.

4. The method of claim 1, wherein the processing of the orthogonally shifted imaged seismic data gathers comprises:
   mapping the orthogonally shifted imaged seismic data gathers to the spectral processing domain; and
   applying the spectral processing function to the mapped orthogonally shifted imaged seismic data gathers to generate the spectrally processed imaged seismic data.

5. The method of claim 4, wherein the mapping of the orthogonally shifted imaged seismic data gathers to the spectral processing domain is performed according to at least one of a velocity field, a slowness field, a depth to time conversion, and a unity field.

6. The method of claim 1, wherein the spectral processing function comprises a frequency band splitting function, an elastic inversion function, an acoustic inversion function, an amplitude versus offset stabilization function, an amplitude versus angle stabilization function, a time-lapse time-shift estimation function, a spectral shaping function, a colored inversion function, a bluing function, a de-noising function, a demultiple function, a residual move-out application or picking, or combinations thereof.

7. The method of claim 1, further comprising outputting the spectrally processed imaged seismic data.

8. A method for spectral analysis of seismic data, the method comprising:
   obtaining imaged seismic data;
   generating orthogonally shifted imaged seismic data gathers by gathering the imaged seismic data transformed to a spectral transform domain and then altered to introduce orthogonal shifts in a non-transform domain; and
   processing the orthogonally shifted imaged seismic data using a spectral processing function to generate spectrally processed imaged seismic data.

9. The method of claim 8, wherein the processing of the orthogonally shifted imaged seismic data comprises:
   mapping the orthogonally shifted imaged seismic data to the spectral processing domain; and
   applying the spectral processing function to the mapped orthogonally shifted imaged seismic data to generate the spectrally processed imaged seismic data,
   the spectral processing function comprising a frequency band splitting function, an elastic inversion function, an acoustic inversion function, an amplitude versus offset stabilization function, an amplitude versus angle stabilization function, a time-lapse time-shift estimation function, a spectral shaping function, a colored inversion function, a bluing function, a de-noising function, a demultiple function, a residual move-out application or picking, or combinations thereof.

10. The method of claim 8, further comprising inverse transforming altered spectral transform domain data to the non-transform domain, to generate the orthogonally shifted imaged seismic data.

11. The method of claim 10, wherein the orthogonally shifted imaged seismic data are gathered according to the orthogonal shifts to generate the orthogonally shifted imaged seismic data gathers.

* * * * *